United States Patent

Kohan et al.

[15] 3,676,400
[45] July 11, 1972

[54] THERMOPLASTIC BLENDS OF HIGH-AMINE-END POLY-AMIDES AND ACID-CONTAINING OLEFIN POLYMERS

[72] Inventors: Melvin I. Kohan, Wilmington, Del.;
Wayne H. Martin, Vienna, W. Va.;
Chester K. Rosenbaum, Westover Hills, Wilmington, Del.

[73] Assignee: E. I. du Pont de Nemours and Company, Wilmington, Del.

[22] Filed: Nov. 13, 1970

[21] Appl. No.: 89,457

Related U.S. Application Data

[63] Continuation of Ser. No. 719,685, April 8, 1968, abandoned, which is a continuation-in-part of Ser. No. 517,935, Jan. 3, 1965, abandoned.

[52] U.S. Cl. .................. 260/857 L, 260/78 R, 260/45.7 P, 260/45.75 C, 260/45.95
[51] Int. Cl. ........................................................... C08g 41/04
[58] Field of Search .............................................. 260/857 L

[56] References Cited

UNITED STATES PATENTS

3,274,289   9/1966   Murdock ........................... 260/857

FOREIGN PATENTS OR APPLICATIONS

1,386,563   12/1964   France .............................. 260/857

*Primary Examiner*—Paul Lieberman
*Attorney*—Edwin Tocker

[57] ABSTRACT

The strength properties of blends of 50 to 90 percent by weight polyamide having a molecular weight of at least 10,000 with 10 to 50 percent by weight of an olefin copolymer containing from 0.1 to 10 mole percent of groups derived from an $\alpha,\beta$-unsaturated carboxylic acid, are improved by having at least 60 percent of the polyamide end groups being amine end groups.

7 Claims, No Drawings

THERMOPLASTIC BLENDS OF HIGH-AMINE-END POLY-AMIDES AND ACID-CONTAINING OLEFIN POLYMERS

This application is a continuation of application, Ser. No. 719,685 which is a continuation-in-part of application, Ser. No. 517,935, filed Jan. 3, 1965, by the same inventors both now abandoned.

This invention relates to thermoplastic blends of high-amine-end polyamides with acidic olefin copolymers.

The blends of this invention are normally solid and consist essentially of from 50 to 90 percent by weight of a polyamide having from 20 to 140 gm equivalents of amine end groups in excess of the number of gm equivalents of carboxyl end groups per $10^6$ gm of polyamide, and complementally, from 10 to 50 per cent by weight of an acid-containing olefin copolymer containing from 0.1 to 10 mole percent of acid groups derived from an $\alpha,\beta$-unsaturated carboxylic acid. Preferably, the polyamide has a molecular weight of at least 10,000 and at least 60 percent of its end groups are amine groups. The olefin copolymer is generally present as a dispersed phase in a continuous phase of polyamide. These blends exhibit properties which are neither additive nor-predicatble from the properties of the individual polymer components. For example, the melt viscosity of these blends is generally greater than either of the components. In addition, the melting point of the polyamide is not depressed by the blending operation and, therefore, the softening temperature of the resultant blend is substantially that of the polyamide.

The high amine ends of the polyamide component contribute significantly to the strength properties of the blend. The high amine-end polyamide, as defined, leads to blends having surprisingly high flex modulus, elongation, hydrolysis resistance and toughness in comparison with the like blends employing polyamides not of the high amine-end type. Another surprising property of the blends which is attributed to the high amine-end type polyamide is the decrease in permeability to hydrophobic hydrocarbon solvents, a property which is important for such applications as containers, wire coating and tubing. The permeability is decreased to about 1/10 of the permeability of like blends employing polyamides not of the high amine-end type.

The polyamides which may be employed in the practice of this invention are well known in the art and embrace those resins having a molecular weight of at least 2,000 and commonly designated as nylons. Generally, however, the molecular weight of the polyamide used herein is from 10,000 to 40,000. "Molecular weight" as used herein refers to nymber average molecular weight for polyamides (see Flory, "Principles of Polymer Chemistry", page 273, published 1953 by Cornell University Press). Among these polyamides are those described in U.S. Pat. Nos. 2,071,250, 2,071,251, 2,130,523, 2,130,948, 2,312,966, 2,241,322 and 2,512,606. The polyamide resin is generally produced by condensation of equimolar amounts of a saturated dicarboxylic acid containing from two to 10 carbon atoms with an alkylene diamine, in which the alkylene group contains from two to 10 carbon atoms. The resultant polyamide contains an excess of carboxyl end groups over the amount of amine end groups present. The reason this occurs is that the diamine reactant, such as hexamethylene diamine, is more volatile than the acid reactant, such as adipic acid, leaving, even when a pressure vessel is used, more acid reactant than amine reactant in the condensation zone of the vessel, and consequently, the resulting polymer contains more acid than amine end groups. Thus, in order to provide the high amine-end polyamides to be used in the blends of this invention, it is necessary to employ a sufficient excess amount of diamine reactant to compensate for its volatility while giving the excess amount of amine end groups desired, within the limits given, in the final product. A convenient description of the proportion of these end groups relative to each other is the number of gm equivalents of amine groups present in the resin in excess of the number of carboxyl groups per $10^6$ gm of resin. See JACS 69, 635–638 (1947). The preferred number of amine end groups is from 25 to 60 gm equivalents in excess of the number of carboxyl end groups per $10^6$ gm of polyamide having a molecular weight of at least 10,000. Preferred polyamides are polyhexamethylene adipamide (66 nylon), polyhexamethylene sebacamide (610 nylon), polycaprolactam (6 nylon), and copolymers thereof, it being understood that these polyamides are made with excess diamine so as to have the excess high-amine-end groups previously described.

With respect to the acid-containing olefin copolymer these should contain at least 90 mole percent of units derived from $\alpha$-monoolefins of the formula $RCH = CH_2$ wherein R is H or $C_1$–$C_{10}$ alkyl. Such monoolefins include ethylene, propylene, butene-1, decene-1, hexene-1, and comonomer mixtures thereof. The remaining units of the olefin copolymer should be derived from monoethylenically $\alpha,\beta$-unsaturated monocarboxylic or dicarboxylic acids, such as acrylic and methacrylic acids, and maleic, fumaric and mono-alkyl esters thereof; the acid preferably has from three to eight carbon atoms. The $\alpha$-monoolefin and acid monomer are copolymerized and the resultant copolymer is blended with the high amine-end polyamide to form the blends of this invention. In a preferred copolymerization process, as described in British Pat. No. 963,380, a mixture of the acid monomer and ethylene is introduced into a polymerization environment, in bulk or in the presence of inert solvent, maintained at high pressures such as 50 to 3,000 atms. and elevated temperatures generally between 150° to 300° C. together with a free radical polymerization initiator, such as a peroxide, hydroperoxide, or azo compound or the like, which decomposes to yield an organic free radical under the reaction conditions. The resultant copolymer is a random copolymer; random copolymers are used in the examples herein. A preferred olefin copolymer consists of ethylene and 2 to 8 mole percent of methacrylic acid. The preferred blends of this invention, insofar as polymer components are concerned, consist of 60 to 85 percent by weight of high amine-end polyamide, particularly polyhexamethylene adipamide and complementally, 15 to 40 percent by weight of acid-containing olefin copolymer, particularly the preferred acid-containing olefin copolymer. These preferred blends are particularly useful in obtaining the advantageous strength and permeability properties hereinbefore noted.

Other components can be also introduced into the blends such as fillers, pigments, dyes, thermal stabilizers, such as sodium hypophosphite (SHP), antioxidants, such as "Santowhite" Powder (4,4'-butylidene-bis-6-t-butyl-m-cresol), U.V. screens, anti-slip agents, plasticizers, nucleating agents, and the like. Additional antioxidants include cupric salts such as copper stearate and copper acetate, alkyl phenolics such as 1,1-bis-(2 methyl-4-hydroxy-5-t-butyl phenyl) butane, and sodium phenyl phosphinate. It is preferred that a stabilizer and an antioxidant be present in the blends of this invention. Generally from 0.05 to 2.0 percent based on the weight of the polyamide of each additive is suitable. Other polymers, particularly thermoplastic olefin polymers, may also be blended with the novel compositions of this invention.

The blends can be made as an intimate mixture by simply melt blending the desired amounts of the components in conventional equipment such as a Banbury mill, extruder or the like. Alternatively, the blends may be made by solution blending. Although the process of manufacture is by no means critical, preferably the blends are made at the lowest temperature compatible with efficient mixing and reacting of the individual components.

The polymeric components of the blends can be dry mixed and the blending accomplished during a melt fabrication operation such as extrusion or injection melt fabrication operation such as extrusion or injection molding. In the case of injection molding of these dry mixtures, screw preplastication or other technique capable of giving good mixing should be employed; alternatively, it is desirable to employ a "rotating spreader" or like device to ensure mixing of the components in the cylinder of the injection molding machine.

The thermoplastic blends of this invention can be manufactured into an exceptionally wide range of articles by conventional methods employed in the fabrication of thermoplastic articles, i.e., as molded parts, extruded shapes including filaments, fibers, bottles, tubing, films, sheets, laminates, wire coating, and the like. The materials can be oriented by stretching, twisting and rolling to form oriented sheets, tapes, strapping, filaments and foils. In the oriented conditions, the polymeric blends of this invention are substantially less liable to split when punctured than most of the prior art materials; thus, oriented strips of polyamide/ethylene methacrylic acid blends may be sewn to fabric with a sewing machine, and are thus valuable as stiffeners and the like in the garment industry. A particularly important use for the blends of this invention is in the recovery for useful purposes of polyamide resins having a molecular weight insufficient to develop optimum properties for thermoplastic molding materials, e.g., the waste polyamides from nylon fiber spinning operations and the like. By the practice of this invention such waste materials may be converted to extremely useful molding compositions. Many other uses for the compositions of this invention will be apparent to those skilled in the art.

The following examples are illustrative of the blends of this invention. Parts and percents are by weight unless otherwise indicated.

EXAMPLE 1

Several blends of polyamide and acid-containing polyolefin are prepared by the general procedure by adding the polymer components together with antioxidant as a dry mixture to a single screw extruder, which extrudes the mixture at 280° C. The hot extrudate is rapidly cooled with water, cut into pellets and dried to a water content of less than 0.2 percent by weight. The pellets are then injection molded into test bars and tumblers.

The polyamide component is either (A) polyhexamethylene adipamide having an inherent viscosity of 1.2 measured as a 1.5 percent weight solution in m-cresol at 25° C. and having about 43 gm equivalents of amine end groups and about 73 gm equivalents of carboxyl end groups per $10^6$ gm equivalents of polyamide, with the sum of the amine and carboxyl end groups being from about 116 gm equivalents per $10^6$ gm equivalents of polyamide, or (B) polyhexamethylene adipamide having a similar inherent viscosity and having 33 gm equivalents of amine groups in excess of the number of carboxyl groups per $10^6$ gm of polyamide, which corresponds to about 64 percent of the end groups being amine. The acid-containing polyolefin is a copolymer (EMAA) of ethylene (E) and methacrylic acid (MAA) having a melt index of 7 measured by the procedure of ASTM D 1238–57T. The results are as follows:

TABLE I
Effect of High Amine Ends on Modulus

| Blend Polyamide | Wt. % Polyamide | Wt. % Acid-Containing Polyolefin (EMAA) | Wt. % Acid in Acid-Containing-Polyolefin (MAA in EMAA) | Flex Mod M psi dry; 23° C. ASTM D 790 |
|---|---|---|---|---|
| A | 60 | 40 | 15 | 174 |
| B | 60 | 40 | 15 | 199 |
| A | 60 | 40 | 16.4 | 126 |
| B | 60 | 40 | 16.4 | 145 |
| A | 50 | 50 | 15 | 125 |
| B | 50 | 50 | 15 | 140 |

TABLE II
Effect of High Amine Ends on Toughness

| Blend Polyamide | Wt. % Polyamide | Wt. % EMAA | Wt. % MAA in EMAA | Tensile Impact Strength dry, –40°C., ft lbs/in² (dumbell specimen) average |
|---|---|---|---|---|
| A | 60 | 40 | 15 | 124 |
| B | 60 | 40 | 15 | 145 |

TABLE III
Effect of High Amine Ends on Permeability

| Blend Polyamide | Wt. % | Wt. % EMAA | Wt. % MAA in EMAA | Permeability [1]—Liquid Toluene gms loss × mils/ 100 in²/day |
|---|---|---|---|---|
| A | 60 | 40 | 15 | 22–43 |
| B | 60 | 40 | 15 | 0–1 |
| A | 50 | 50 | 15 | 300–400 |
| B | 50 | 50 | 15 | 40–47 |

(1) Permeability measured at 23°C on films from 5 to 20 mils thick

EXAMPLE 2

Blends of polyamides and acid-containing polyolefin were prepared substantially as in Example 1. Test pieces were similarly prepared. The polyamides used in the experiments of this Example, are described in a footnote to Table IV. The mandrel bend test is conducted by bending a ½ X ⅛ X 5 inch bar 180° around an one-eighth inch diameter mandrel. The results, including tests carried out on polyamides alone, are as follows:

TABLE IV

| | Polyamide A | Polyamide C (high amine end) | Blend of 80 parts polyamide A with 20 parts EMAA (i) | (ii) | (iii) | Blend of 80 parts Polyamide C with 20 parts EMAA |
|---|---|---|---|---|---|---|
| Percent MAA in EMAA | | | 10.0 | 9.8 | 10.8 | 10.8 |
| Melt Index of EMAA | | | 8.5 | 4.2 | 6.0 | 6.0 |
| Tensile strength (ASTM D-638): | | | | | | |
| Average p.s.i. | 12,000 | 11,800 | 9,600 | 9,200 | 9,400 | 10,200 |
| Range, M p.s.i. | 11.9–12.1 | 11.7–11.8 | 9.5–9.7 | 9.1–9.3 | 9.3–9.4 | 10.0–10.5 |
| Elongation, percent (ASTM D-638): | | | | | | |
| Average | 81 | 98 | 39 | 44 | 42 | 88 |
| Range | 55–92 | 92–102 | 34–45 | 35–48 | 35–58 | 80–108 |
| Notched Izod, ft. lb./in. (ASTM D-256): | | | | | | |
| Average | 1.1 | 0.6 | 1.9 | 2.2 | 2.2 | 2.9 |
| Range | 0.5–1.3 | 0.4–1.0 | 1.8–2.1 | 2.0–2.3 | 2.1–2.2 | 2.4–3.5 |
| Mandrel bend, breaks/bends | 0/40 | 0/40 | 1/40 | 0/40 | 0/40 | 0/40 |
| Tensile impact, ASTM D1822-61T, ft. lb./in.²: | | | | | | |
| Type S, 1/16″: | | | | | | |
| Average | | | 93 | 100 | 104 | 137 |
| Range | | | 80–103 | 89–115 | 94–114 | 114–249 |
| Type S, 1/8″: | | | | | | |
| Average | | | 86 | 95 | 103 | 135 |
| Range | | | 62–111 | 87–104 | 89–117 | 122–161 |
| Type L, 1/16″: | | | | | | |
| Average | | | 215 | 223 | 215 | 277 |
| Range | | | 172–248 | 171–277 | 165–283 | 262–343 |
| Type L, 1/8″: | | | | | | |
| Average | | | 242 | 232 | 246 | 284 |
| Range | | | 209–294 | 205–333 | 217–290 | 260–311 |

NOTE.—All specimens were tested dry-as-molded.
A = Polyhexamethylene adipamide of the same letter in Example I.
C = Polyhexamethylene adipamide of similar inherent viscosity as (A) and containing 0.2% by weight Santowhite Powder and 0.12% by weight sodium hypophosphite and having about 40 gm. equivalents of amine end groups in excess of carboxyl end groups per $10^6$ gm. of polyamide.

TABLE V

Tensile Properties after Exposure to 35% KOH at 71°C. [1,2]

| Exposure Time, Weeks | | Yield Stress, psi (3) | Ultimate Elongation, % (1) |
|---|---|---|---|
| Polyamide A | 8 | 8500 | 170(160, 180) |
| | 16 | 7400 (4) | 40(70, 10) |
| Polyamide C | 8 | 8100 | 240(245,50) |
| | 16 | 7800 | 75(70, 80) |
| 80(A)+20 (EMAA) | 8 | 6600 | 240(250, 230) |
| | 16 | 6200 | 105(80, 130) |

(1) All specimens were tested "wet," i.e., as-conditioned.
(2) Temperature was 80–82°C. for the first 13 weeks, and 71°C. thereafter.
(3) Data reported are averages for two specimens, Individual values of elongation are given in parentheses.
(4) Two values 8300 and 6560 psi. The latter bar did not yield, but gave a brittle break (10% elongation).

TABLE VI

Mandrel Bend After Exposure to 35% KOH at 71°C. [1]

| Exposure Time (hr) | Temp. (°C.) | Polyamide A | 80(A)° (EMAA)[4] | 80(C)° (EMAA)[4] |
|---|---|---|---|---|
| 144 | 80 | 1/8 | 0/8 | 0/8 |
| 240 | 80 | 1/8 | 1/8 | 0/8 |
| 370 | 80 | 1/8 | 0/8 | 0/8 |
| 754 | 80–71(1) | 2/8 | 1/8 | 0/8 |
| 1000 | 71 | 1/8 | 1/8 | 0/8 |
| 2007 | 71 | 8/8 | 1/8 | 0/8 |

Mandrel Bend[2], Breaks/Bends[3]

(1) Temperature was 80°C. for the first 744 hr, and 71°C. thereafter.
(2) Bars were dried 72 hr at 100°C. under nitrogen prior to testing.
(3) Number of breaks/number tested.
(4) In Tables V and VI, A = polyamide component (A) of Example I; C = polyamide C of Table IV; and EMAA is type (i) of Table IV.

TABLE VII

Mandrel Bend After Exposure to Boiling pH-2, pH-7, and pH-10 Solutions[1,4]

Percent Breaks in Mandrel Bend Test[5]

| pH | Time hr | Polyamide A | Polyamide C | 80(A)° (EMAA) | 80(C)° (EMAA) |
|---|---|---|---|---|---|
| 2 | 16 | 25+ | 50+ | 25+ | 0 |
| 2 | 24 | 38+ | 50+ | 0+ | 0 |
| 2 | 48 | 100 | 100++ | 100 | 25 |
| 2 | 96 | 100 | 100++ | 100 | 17 |
| 2 | 171 | 100 | 100++ | 100 | 100 |
| 2 | 267 | 100 | 100 ++ | 100 | 100 |
| 7 | 117[2] | 25 | 33 | 83 | 0 |
| 7 | 283[2] | 17 | 25 | 17 | 0 |
| 7 | 360 | 8 | 17 | 8 | 0 |
| 7 | 456 | 0 | 17 | 8 | 0 |
| 7 | 600 | 17 | 33 | 25 | 0 |
| 7 | 765 | 8 | 25 | 25 | 0 |
| 7 | 860 | 33 | 0 | 17 | 0 |
| 7 | 982 | 25 | 42 | 33 | 0 |
| 10 | 117[3] | 25 | 17 | 33 | 0 |
| 10 | 260 | 17 | 33 | 33 | 0 |
| 10 | 352 | 17 | 8 | 8 | 8 |
| 10 | 429 | 25 | 25 | 25 | 0 |
| 10 | 525 | 33 | 25 | 17 | 0 |
| 10 | 621 | 25 | 25 | 50 | 0 |
| 10 | 763 | 17 | 17 | 0 | 17 |
| 10 | 928 | 8 | 33 | 17 | 8 |
| 10 | 1023 | 42 | 42 | 33 | 0 |
| 10 | 1145 | 33 | 25 | 33 | 8 |

(1) Bars were dried at 100°C. under N₂ for ca. 90 hr before testing.
(2) pH was ca. 8–9 for most of the first 188 hr.
(3) pH was ca. 11 for most of the first 117 hr.
(4) Except for exceptions in Notes (2) and (3), the solutions were maintained at the indicated pH (2, 7, 10) ± 0.2 pH units.
(5) Total number of bends was 12 except where indicated by + (8 bends) or ++ (4 bends).

TABLE VIII

Tensile Properties After Aging at 150°C. in Air

| Composition | Time hr. | Ten sile strength, psi (1) | Elongation, % (1) |
|---|---|---|---|
| Polyamide A | 0 | 12,000 | 81 |
| Polyamide A | 3 | 11,700 | 6 |
| Polyamide A | 6 | 9,500 | 5 |
| Polyamide A | 16 | 7,500 | 3 |
| Polyamide C | 0 | 11,800 | 98 |
| Polyamide C | 3 | 12,200 | 53 |
| Polyamide C | 6 | 12,300 | 50 |
| Polyamide C | 16 | 11,300 | 4 |
| Polyamide C | 24 | 8,500 | 3 |
| 80(A)+(EMAA)[2] | 0 | 9,400 | 42 |
| 80(A)+(EMAA)[2] | 3 | 9,100 | 7 |
| 80(A)+(EMAA)[2] | 6 | 8,500 | 3 |
| 80(A)+(EMAA)[2] | 16 | 6,900 | 3 |
| 80(C)+(EMAA)[2] | 0 | 10,200 | 88 |
| 80(C)+(EMAA)[2] | 3 | 10,400 | 57 |
| 80(C)+(EMAA)[2] | 6 | 10,700 | 50 |
| 80(C)+(EMAA)[2] | 16 | 10,600 | 30 |
| 80(C)+(EMAA)[2] | 24 | 10,100 | 8 |

(1) Average values for five specimens.
(2) In Tables VII and VIII, A = polyamide component (A) of Example I; C = polyamide (C) of Table IV; and EMAA is type (iii) of Table IV.

In the foregoing Tables V–VIII, 80(A) or (C) means 80 parts of the polyamide, and 20(EMAA) means 20 parts of the acid copolymer.

As many apparently widely different embodiments of this invention may be made without departing from the spirit and scope thereof, it is to be understood that this invention is not limited to the specific embodiments thereof except as defined in the appended claims.

We claim:

1. A thermoplastic composition consisting essentially of an intimate mixture of from 50 to 90 percent by weight of a polyamide which is polyhexamethylene adipamide wherein at least 60 percent of the end groups of said polyamide are amine end groups, having a molecular weight of at least 10,000 and having from 20 to 140 gram equivalents of amine end groups in excess of the number of gram equivalents of carboxyl end groups per $10^6$ grams of said polyamide and, complementally, from 10 to 50 percent by weight of an olefin copolymer containing from 0.1 to 10 mole percent of groups derived from a monoethylenically $\alpha,\beta$-unsaturated carboxylic acid containing from three to eight carbon atoms and in which the olefin is of the formula $CRH = CH_2$, wherein R is H or $C_1$-$C_{10}$ alkyl.

2. The composition of claim 1 wherein the excess number of amine end groups in the polyamide is from 25 to 60 as defined.

3. The composition of claim 1 wherein said olefin copolymer is a copolymer of ethylene and from 0.1 to 10 mole percent of an $\alpha,\beta$-unsaturated carboxylic acid.

4. The composition of claim 3 wherein the said $\alpha,\beta$-unsaturated acid is methacrylic acid.

5. The composition of claim 1 containing from 0.05 to 2.0 percent each of thermal stabilizer and antioxidant, based on the weight of said polyamide.

6. The composition of claim 5 wherein said thermal stabilizer is sodium hypophosphite and said antioxidant is 4,4'-butylidene-bis-6-t-butyl-m-cresol.

7. The composition of claim 1 wherein said excess is 33 gram equivalents of amine end groups.

* * * * *